United States Patent

Rovnyak et al.

[11] 3,927,014
[45] Dec. 16, 1975

[54] SUBSTITUTED MERCAPTO BENZIMIDAZOLES

[75] Inventors: George Rovnyak, Hopewell; Venkatachala L. Narayanan, Hightstown; Rudiger D. Haugwitz, Titusville; Christopher M. Cimarusti, Hamilton, all of N.J.

[73] Assignee: E. R. Squibb & Sons, Inc., Princeton, N.J.

[22] Filed: July 29, 1974

[21] Appl. No.: 492,644

[52] U.S. Cl....... 260/306.7 T; 260/243 R; 424/246; 424/270
[51] Int. Cl.²..................................... C07D 235/28
[58] Field of Search ................. 260/306.7 T, 243 R

[56] References Cited
UNITED STATES PATENTS
3,755,316   8/1973   Narayanan et al. .......... 260/306.7 T OTHER PUBLICATIONS
Bost et al., *J. Am. Chem. Soc.*, 65 (1943), pp. 900–901.
Wagner et al., *Synthetic Organic Chemistry*, N.Y., Wiley, 1953, pp. 645 and 787–788.

*Primary Examiner*—R. Gallagher
*Attorney, Agent, or Firm*—Lawrence S. Levinson; Merle J. Smith; Stephen B. Davis

[57] ABSTRACT
Compounds of the following formula (I)

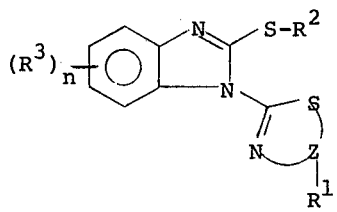

wherein Z is ethylene or propylene; $R^1$ is hydrogen, methyl, ethyl, phenyl, nitrophenyl, benzyl, phenethyl, tolyl or xylyl; $R^2$ is alkyl of from 1 to 5 carbons, benzyl, nitrobenzyl, phenethyl, nitrophenethyl, alkoxycarbonylalkylene wherein the alkoxy radical has from 1 to 5 carbons and the alkylene radical has 1 to 3 carbons, dialkylaminoalkylene wherein the dialkyl radicals have from 1 to 3 carbons and the alkylene radical has 2 or 3 carbons, alkanoyl of from 2 to 18 carbons, benzoyl, a substituted benzoyl wherein said substituent is halogen, alkyl of 1 to 3 carbons or phenyl, phenylmethylcarbonyl, phenethylcarbonyl,

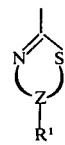

wherein Z and $R^1$ are as defined above,

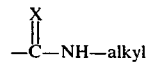

wherein alkyl is of 1 to 5 carbons, or

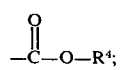

$R^4$ is alkyl of 1 to 3 carbons, phenyl, benzyl or phenethyl; X is O or S; $R^3$ is hydrogen, halogen, nitro, amino, cyano, trifluoromethyl, alkyl of from 1 to 3 carbons, alkoxy of from 1 to 3 carbons, dialkylamino wherein each alkyl radical is from 1 to 3 carbons, alkanoyl of from 2 to 6 carbons, or benzoyl; and n is 1 or 2; are disclosed. These compounds exhibit antiinflammatory activity.

8 Claims, No Drawings

3,927,014

SUBSTITUTED MERCAPTO BENZIMIDAZOLES

BACKGROUND OF THE INVENTION

The prior art discloses the use of substituted benzimidazolinone compounds as antiinflammatory agents as note U.S. Pat. No. 3,813,409 issued on May 28, 1974. It has been discovered that substituted mercapto benzamidazole compounds are also useful as antiinflammatory agents.

This invention relates to new compounds of the formula:

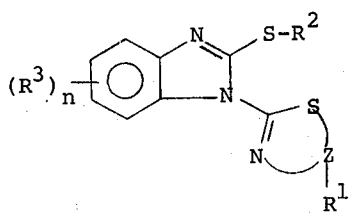

which exhibit antiinflammatory activity.

Z represents ethylene or propylene.

R$^1$ represents hydrogen, methyl, ethyl, phenyl, nitrophenyl, benzyl, phenethyl, tolyl or xylyl.

R$^2$ is alkyl of 1 to 5 carbons, e.g. methyl, ethyl, n-propyl, i-propyl, t-butyl, etc.; benzyl; nitrobenzyl; phenethyl; nitrophenyl; alkoxycarbonylalkylene wherein the alkoxy radical has from 1 to 5 carbons, e.g. methoxy, i-propoxy, t-butoxy, etc., and the alkylene radical has 1 to 3 carbons, e.g.

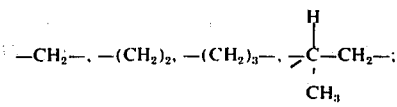

dialkylaminoalkylene wherein each alkyl radical has 1 to 3 carbons and the alkylene radical has 2 or 3 carbons; alkanoyl of from 2 to 18 carbons; benzoyl; substituted benzoyl wherein said substituent is halogen, alkyl of 1 to 3 carbons, or phenyl; phenylmethylcarbonyl; phenethylcarbonyl;

wherein Z and R$^1$ are as defined above;

wherein alkyl is of 1 to 5 carbons; or

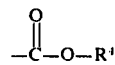

R$^4$ is alkyl of 1 to 3 carbons, phenyl, benzyl, or phenethyl.

X is O or S.

R$^3$ is hydrogen, halogen, nitro, amino, cyano, trifluoromethyl, alkyl of from 1 to 3 carbons, alkoxy of from 1 to 3 carbons, dialkylamino wherein each alkyl radical is from 1 to 3 carbons, alkanoyl of from 2 to 6 carbons, or benzoyl.

n is 1 or 2.

The compounds of formula I having a basic substituent, for example, where R$^2$ is dialkylaminoalkylene or R$^3$ is amino or dialkylamino form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again by formed from the free base and the appropriate inorganic acid. Illustrative are the hydrohalides, especially the hydrochloride and hydrobromide which are preferred, sulfate, nitrate, phosphate, tartrate, maleate, fumarate, citrate, succinate, methanesulfonate, benzenesulfonate, toluenesulfonate, and the like.

DETAILED DESCRIPTION OF THE INVENTION

Compounds of formula I where R$^2$ is alkyl, benzyl, nitrobenzyl, phenethyl, nitrophenethyl, alkanoyl, alkoxycarbonylalkylene, dialkylaminoalkylene, benzoyl, substituted benzoyl, phenylmethylcarbonyl, phenethylcarbonyl, alkoxycarbonyl, phenoxycarbonyl, benzyloxycarbonyl, or 2-phenyl ethoxycarbonyl are prepared by treating the substituted benzimidazole-2-thiol of formula II

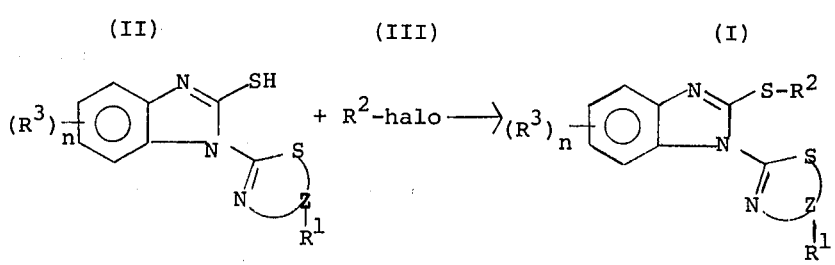

with a compound of formula III at a molar ratio of from about 1:1 to about 1:3 at a temperature of from about 25°C to about 150°C for about 0.5 to about 24 hours in the presence of a polar aprotic solvent such as dimethylformamide (DMF) or dimethylsulfoxide (DMSO) or an ethereal solvent such as tetrahydrofuran (THF) and a strong base such as sodium hydride, sodium amide, sodium or potassium alkoxy salts, or sodium or potassium in the presence of liquid ammonia.

The substituted benzimidazole-2-thiols of formula II are prepared from the appropriate 2-(o-aminoanilino)-2-thiazoline of formula IV by heating with carbon disulfide in alcohol, or by the action of thiophosgene in chloroform, or by heating with potassium ethyl xanthate (Van Allan et al., Organic Syntheses, Collective Vol. 4, p. 569-570).

(IV) 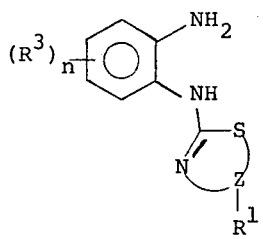

(II) 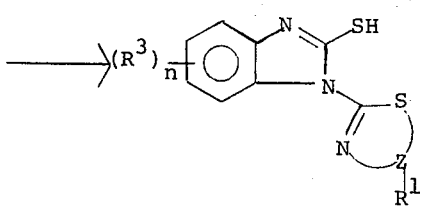

The substituted benzimidazole-2-thiols of formula II may exist in a tautomeric form wherein a hydrogen atom is attached to the nitrogen atom and the double bond is exocylic.

The 2-(o-aminoanilino)-2-thiazolines of formula IV are prepared by reacting o-phenylenediamine of formula V with an haloalkylisothiocyanate of formula VI as taught in U.S. Pat. No. 3,816,444 issued on June 11, 1974 to Narayanan et al.

(V) 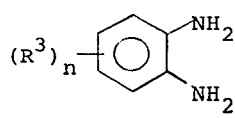

(VI) 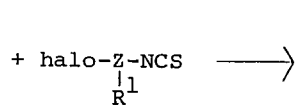

(IV) 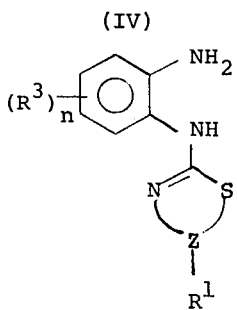

are prepared by reacting the substituted benzimidazole-2-thiol of formula II with a haloalkylisothiocyanate of formula VI at a molar ratio of from about 1:1 to about 1:3 at a temperature of from about 25°C to about 150°C for from about 0.5 to about 24 hours in the presence of a polar aprotic or ethereal solvent and strong base as described above. Similarly, compounds of formula I where $R^2$ is

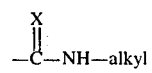

are prepared by reacting the substituted benzimidazole-2-thiol of formula II with an isocyanate or isothiocyanate of formula <div style="text-align:right">(VII)</div> alkyl—N=C=X at a molar ratio of from about 1:1 to 1:2 at a temperature of from about 0°C to about 120°C for from about 0.5 to about 8 hours in the presence of a polar aprotic or ethereal solvent and a strong base as described above.

Alternatively, the compounds of formula I where $R^2$ is alkyl, benzyl, nitrobenzyl, phenethyl, nitrophenethyl, alkanoyl, alkoxycarbonylalkylene, dialkylaminoalkylene, benzoyl, substituted benzoyl, alkoxycarbonyl, phenoxycarbonyl, benzyloxycarbonyl, 2-pheny ethoxycarbonyl, phenylmethylcarbonyl, or phenethylcarbonyl may be prepared by treating a substituted benzimidazole of formula VIII with a haloalkylisothiocyanate of formula VI (VIII) 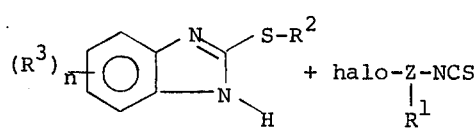

(VI) halo-Z-NCS (I) 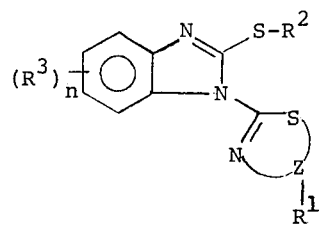

Compounds of formula I where $R^2$ is

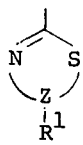

at a molar ratio of from about 1:1 to about 1:3 at a temperature of from about 25°C to about 150°C for about from 0.5 to about 24 hours in the presence of a non-polar aprotic solvent such as benzene, toluene, xylene, 1,2-dimethoxyethane (glyme), or bis(2-methoxyethyl)ether (diglyme) or any of the polar aprotic solvents and strong bases as described above.

The compounds of formula VIII are prepared by reacting the mercaptobenzimidazole of formula (IX)

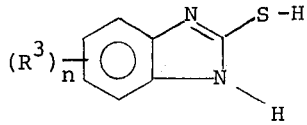

with $R^2$-halo in the presence of a polar aprotic or ethereal solvent and strong base. The mercaptobenzimidazole of formula IX is prepared from an o-phenylenediamine of formula V by heating with carbon disulfide in alcohol, by the action of thiophosgene in chloroform, or by heating with potassium ethyl xanthate (Van Allan et al., supra).

The preferred compounds are those wherein $R^1$ is hydrogen; $n$ is 1; $R^3$ is hydrogen, halogen, nitro, or alkyl of 1 to 3 carbons; and $R^2$ is benzoyl or substituted benzoyl.

The most preferred compounds are those wherein Z is ethylene; $R^3$ is hydrogen, methyl or Cl, especially hydrogen; and $R^2$ is (p-phenyl)benzoyl.

The compounds of this invention are useful as antiinflammatory agents and are effective in the prevention and inhibition of granuloma tissue formation in warm blooded animals, and may be used, for example, in a manner similar to phenylbutazone or indomethacin. They may be used to decrease joint swelling, tenderness, pain and stiffness in mammalian species, e.g., in conditions such as rheumatoid arthritis. The compounds of this invention or a physiologically acceptable acid-addition salt thereof as described above may be compounded according to accepted pharmaceutical practice for administration orally or by injection. Suitable oral dosage forms are tablets, capsules, elixirs, or powders, while solutions or suspensions are suitable for injection. The quantity administered may be from about 25 mg. to about 2 gm. per day, and preferably from about 50 mg. to about 200 mg. per day.

The following examples are illustrative of the invention. All temperatures are on the centigrade scale.

EXAMPLE 1

[1,1'-Biphenyl]-4-carbothioic acid, S-[1-(4,5-dihydro-2-thiazolyl)-1H-benzimidazol-2-yl]ester a. 2-(o-Aminoanilino)-2-thiazoline A solution of 7.8 g. (0.07 mole) of o-phenylenediamine and 11.9 g. (0.07mole) of 2-bromoethyl isothiocyanate in 150 ml. of dry glyme is stirred at room temperature for one hour. The solution is decanted and the remaining viscous oil is taken up in water, basified with $K_2CO_3$ and extracted with warm $CHCl_3$. The combined $CHCl_3$ extracts are washed with water and cooled in an ice-bath. The precipitated crystals are collected by filtration and dried yielding 6.6 g. of 2-(o-aminoanilino)-2-thiazoline, Recrystallization from $CHCl_3$ yields an analytical sample, m.p. 165°–167°.

b. 1-(4,5-Dihydro-2-thiazolyl)-1H-benzimidazole-2-thiol

A solution of 7.0 g. (0.04 mole) of 2-(o-aminoanilino)-2-thiazoline from part (a), 11.2 g. (0.15 mole) of carbon disulfide and 2.8 g. (0.05 mole) of KOH in 70 ml. of ethanol and 10 ml. of water is refluxed for 5 hours. After the reaction mixture is cooled, hair-like crystals are formed in the flask. These crystals are collected by filtration and washed with diethyl ether yielding 2.4 g. (25%) of 1-(4,5-dihydro-2-thiazolyl)-1H-benzimidazole-2-thiol; m.p. 188°–189°.

c. [1,1'-Biphenyl]-4-carbothioic acid, S-[1-(4,5-dihydro-2-thiazolyl)-1H-benzimidazol-2-yl]ester 0.31 g. (0.0125 moles) of sodium hydride is added in small portions to a stirred solution of 2.0 g. (0.0085 moles) of 1-(4,5-dihydro-2-thiazolyl)-1H-benzimidazole-2-thiol, from part (b), in 100 ml. of dry THF at room temperature. The resulting mixture is warmed in a water bath at 40° for 0.5 hours and then cooled in an ice bath to 0° while a solution of 2.3 g. (0.01 mole) of 4-biphenylcarbonyl chloride in 50 ml. of dry THF is added. This mixture is heated at reflux temperature for 2.5 hours. The reaction mixture is cooled, filtered, and the solids are washed with $CHCl_3$. The combined washings and filtrate are concentrated in vacuo. The residue is dissolved in 300 ml. of $CHCl_3$ and washed with 200 ml. of a dilute solution of NaOH and twice with 200 ml. of water. The organic phase is dried (anhydrous $MgSO_4$ and concentrated in vacuo to yield 1.9 g. of crude material. This material is recrystallized from acetone-hexane to give 1.2 g. (34%) of [1,1'-biphenyl]-4-carbothioic acid, S-[1-(4,5-dihydro-2-thiazolyl)-1H-benzimidazol-2-yl]ester; m.p. 181.5°–183°.

EXAMPLE 2

Octadecanethioic acid, S-[1-(4,5-dihydro-2-thiazolyl)-1H-benzimidazol-2-yl]ester 0.31 g. (0.0125 moles) of sodium hydride is added in small portions to a stirred solution of 2.0 g. (0.0085 moles) of 1-(4,5-dihydro-2-thiazolyl)-1H-benzimidazole-2-thiol, from example 1b, in 100 ml. of dry THF at room temperature. The resulting mixture is warmed in a water bath at 40° for 0.66 hours and then cooled in an ice bath to 0° while a solution of 3.1 g. (0.01 mole) of stearoyl chloride in 50 ml. of dry THF is added. This mixture is heated at reflux temperature for 2.5 hours. The reaction mixture is cooled, filtered, and the solids are washed with $CHCl_3$. The combined washings and filtrate are concentrated in vacuo. The residue is dissolved in 250 ml. of $CHCl_3$ and washed with 150 ml. of a dilute aqueous NaOH solution and three times with 150 ml. of water. The organic phase is dried (anhydrous $MgSO_4$) and concentrated in vacuo to yield a white solid residue. This residue is recrystallized from THF-methanol to yield 1.8 g. (43%) of octadecanethioic acid, S-[1-(4,5-dihydro-2-thiazolyl)-1H-benzimidazol-2-yl]ester; m.p. 95°–97.5°.

EXAMPLE 3

Benzenepropanothioic acid, S-[1-(4,5-dihydro-2-thiazolyl)-1H-benzimidazol-2-yl]ester Following the procedure of example 1 but substituting 1.9 g. (0.0113 mole) of hydrocinnamoyl chloride for the 4-biphenylcarbonyl chloride in part (c), one obtains a yellow solid residue. This material is recrystallized twice from acetone-hexane to yield 1.5 g. (46%) of benzenepropanothioic acid, S-[1-(4,5-dihydro-2-thiazolyl)-1H-benzimidazol-2-yl]-ester; m.p. 112.5°–114°.

EXAMPLE 4

1-(4,5-Dihydro-2-thiazolyl)-2-[(phenylmethyl)thio]-1H-benzimidazole 11.75 g. (0.05 mole) of 1-(4,5-dihydro-2-thiazolyl)-1H-benzimidazole-2-thiol, from example 1b, in 100 ml. of DMF is added to a slurry of 1.32 g. (0.055 moles) sodium hydride in 50 ml. of dry DMF at room temperature. After stirring for two hours, a solution of 6.25 g. (0.055 moles) of benzyl chloride in 50 ml. of DMF is added. The mixture is warmed to 70° for three hours. Upon cooling, the reaction mixture is carefully diluted with two volumes of water. The oil that separates is washed with water and then triturated with hexane. The solids that form are collected by filtration and recrystallized from ethanol to give 1-(4,5-dihydro-2-thiazolyl)-2-[(phenylmethyl)-thio]-1H-benzimidazole.

EXAMPLES 5–38

Following the procedures of examples 1 to 4 but employing the compounds of the formula $R^2$-halo listed below in column A, there are obtained the products of the following formula wherein $R^2$ is the radical listed in column B:

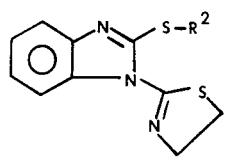

| Ex. | Col. A | Col. B |
|---|---|---|
| 5 | $C_2H_5Br$ | $-C_2H_5$ |
| 6 | $n-C_5H_{11}Cl$ | $-n-C_5H_{11}$ |
| 7 | o-$NO_2$-C₆H₄-$CH_2Cl$ | -$CH_2$-C₆H₄-o-$NO_2$ |
| 8 | m-$NO_2$-C₆H₄-$CH_2Cl$ | -$CH_2$-C₆H₄-m-$NO_2$ |
| 9 | p-$O_2N$-C₆H₄-$CH_2Cl$ | -$CH_2$-C₆H₄-p-$NO_2$ |
| 10 | C₆H₅-$CH_2CH_2Br$ | -$CH_2CH_2$-C₆H₅ |
| 11 | p-$NO_2$-C₆H₄-$CH_2CH_2Br$ | -$CH_2CH_2$-C₆H₄-p-$NO_2$ |
| 12 | $SCN(CH_2)_2Cl$ | (thiazoline) |
| 13 | $SCN(CH_2)_3Br$ | (dihydrothiazine) |
| 14 | $SCNCH_2CHCH_2Br$ with $CH_3$ | (methyl dihydrothiazine) |
| 15 | C₆H₅-COCl | -CO-C₆H₅ |
| 16 | m-Br-C₆H₄-COBr | -CO-C₆H₄-m-Br |
| 17 | p-Br-C₆H₄-COCl | -CO-C₆H₄-p-Br |
| 18 | o-Br-C₆H₄-COCl | -CO-C₆H₄-o-Br |
| 19 | o-Cl-C₆H₄-COCl | -CO-C₆H₄-o-Cl |
| 20 | m-Cl-C₆H₄-COCl | -CO-C₆H₄-m-Cl |
| 21 | p-Cl-C₆H₄-COCl | -CO-C₆H₄-p-Cl |
| 22 | p-$H_3C$-C₆H₄-COCl | -CO-C₆H₄-p-$CH_3$ |
| 23 | C₆H₅-$CH_2$-COBr | -CO-$CH_2$-C₆H₅ |
| 24 | $CH_3O$-COBr | -CO-$OCH_3$ |
| 25 | $C_2H_5O$-COCl | -CO-$OC_2H_5$ |
| 26 | $C_3H_7O$-COCl | -CO-$OC_3H_7$ |

| Ex. | Col. A | Col. B |
|---|---|---|
| 27 | Ph-O-C(=O)Br | -C(=O)-O-Ph |
| 28 | Ph-CH$_2$-O-C(=O)Cl | -C(=O)-O-CH$_2$-Ph |
| 29 | Ph-(CH$_2$)$_2$-O-C(=O)Cl | -C(=O)-O-(CH$_2$)$_2$-Ph |
| 30 | (CH$_3$)$_2$N-(CH$_2$)$_2$Cl | -(CH$_2$)$_2$-N(CH$_3$)$_2$ |
| 31 | (CH$_3$)(C$_3$H$_7$)N-(CH$_2$)$_3$Cl | -(CH$_2$)$_3$-N(CH$_3$)(C$_3$H$_7$) |
| 32 | CH$_3$O-C(=O)-CH$_2$Br | -CH$_2$-C(=O)-OCH$_3$ |
| 33 | CH$_3$O-C(=O)-(CH$_2$)$_2$Cl | -(CH$_2$)$_2$-C(=O)-OCH$_3$ |
| 34 | C$_2$H$_5$O-C(=O)-(CH$_2$)$_3$Br | -(CH$_2$)$_3$-C(=O)-OC$_2$H$_5$ |
| 35 | C$_5$H$_{11}$O-C(=O)-(CH$_2$)$_2$Cl | -(CH$_2$)$_2$-C(=O)-OC$_5$H$_{11}$ |
| 36 | C$_2$H$_5$COBr | -C(=O)C$_2$H$_5$ |
| 37 | CH$_3$COBr | -C(=O)CH$_3$ |
| 38 | CH$_3$(CH$_2$)$_4$COCl | -C(=O)(CH$_2$)$_4$CH$_3$ |

EXAMPLE 39

[[1-(4,5-Dihydro-2-thiazolyl)-1H-benzimidazol-2-yl]thio]acetic acid, ethyl ester a. (Benzimidazol-2-yl) thioacetic acid, ethyl ester A solution of 30 g. (0.2 mole) of 2-mercapto-benzimidazole in 100 ml. of DMF is added to a stirred slurry of 4.8 g. (0.2 moles) of sodium hydride in 300 ml. of DMF at 25°. The solution is stirred for 1 hour until the evolution of gas is complete. 36.7 g. (0.22 mole) of ethyl bromoacetate is added slowly at 25° and the mixture is stirred overnight. Afterwards, the mixture is diluted with 3 volumes of water and extracted with ether. The organic phase is dried (anhydrous MgSO$_4$) and concentrated in vacuo to give an oil. The product is purified by chromatography on neutral alumina (400 g., Act I) and eluted with ethyl acetate-hexane. Crystallization from ethyl acetate-hexane gives 19 g. (41%) of (benzimidazol-2-yl)thioacetic acid, ethyl ester; m.p. 95°–96.5°.

b. [[1-(4,5-Dihydro-2-thiazolyl)-1H-benzimidazol-2-yl]thio]-acetic acid, ethyl ester An oil dispersion (57% mineral oil) of 2.9 g. (0.07 moles) of sodium hydride is added in small portions to a stirred solution of 16.5 g. (0.07 moles) of (benzimidazol-2-yl)thioacetic acid, ethyl ester, from part (a), in 450 ml. of dry glyme. The resulting orange mixture is stirred at room temperature for 1 hour. Afterwards, a solution of 8.5 g. (0.07 moles) of 2-chloroethyl isothiocyanate in 50 ml. of dry glyme is added dropwise. The resulting dark brown mixture is heated at reflux temperature for 3 hours and the solvent is removed in vacuo. The residue is dissolved in 500 ml. of CHCl$_3$ and washed with dilute HCl, dilute NaHCO$_3$ and saturated brine. The organic phase is dried (anhydrous MgSO$_4$), treated with charcoal, and concentrated in vacuo. The crude product is recrystallized from THF-water to yield 3.5 g. of [[1-(4,5-dihydro-2-thiazolyl)-1H-benzimidazol-2-yl]thio]acetic acid, ethyl ester; m.p. 99°–101.5°.

EXAMPLES 40–48

Following the procedure of example 1 but substituting for the 2-bromoethyl isothiocyanate in part (a) the haloalkylisothiocyanates shown in column A the product shown in column B is obtained.

| | Col. A | Col. B |
|---|---|---|
| | halo-Z-NCS with R$^1$ | benzimidazole-thiazoline structure with S-C(=O)-C$_6$H$_4$-C$_6$H$_5$ and Z, R$^1$ substituents |

| Ex. | Z–R$^1$ | |
|---|---|---|
| 40 | | -CH$_2$-CH$_2$-CH$_2$- |
| 41 | | -CH$_2$-CH(CH$_3$)- |
| 42 | | -CH$_2$-CH(C$_2$H$_5$)-CH$_2$- |
| 43 | | -CH$_2$-CH(Ph)- |
| 44 | | -CH$_2$-CH(p-NO$_2$-C$_6$H$_4$)-CH$_2$- |

| Ex. | Col. A | Col. B |
|---|---|---|

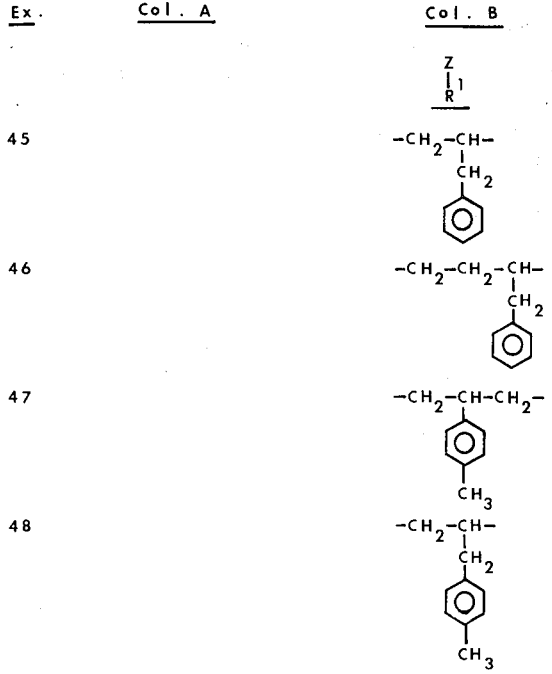

| 45 | | -CH$_2$-CH(Z)(R)-CH$_2$-⌬ |
| 46 | | -CH$_2$-CH$_2$-CH(-⌬)- |
| 47 | | -CH$_2$-CH(-⌬-CH$_3$)-CH$_2$- |
| 48 | | -CH$_2$-CH(-CH$_2$-⌬-CH$_3$)- |

Similarly, by employing these haloalkylisothiocyanates in any of examples 2 to 39, other compounds of formula I within the scope of this invention are prepared.

EXAMPLE 49

[1,1'-Biphenyl]-4-carbothioic acid, S-[1-(4,5-dihydro-2-thiazolyl)-5(or 6)-methyl-1H-benzimidazol-2-yl]ester a. 1-(4,5-Dihydro-2-thiazolyl)-5(or 6)-methyl-1H-benzimidazole-2-thiol A solution of 6.85 g. (0.0416 mole) of 2-mercapto-5-methyl-benzimidazole [prepared by the general method of Van Allan et. al., Org. Syn., Coll. Vol. 4, p. 569 (1963), m.p. 285°–292°] in 270 ml. of dry glyme is stirred under nitrogen at room temperaure with 4.05 g. (0.0955 mole) of 57% sodium hydride dispersion in mineral oil. After 1.5 hours, 10 g. (0.0832 mole) of 2-chloroethyl isothiocyanate is added and the slurry is refluxed for 3 hours, cooled, and the solvent removed in vacuo. The residue is treated with methanol to decompose unreacted hydride and the methanol is removed in vacuo. The resulting oil is triturated with hexane (hexane discarded) and the oil is partitioned between chloroform and water containing a slight excess of acetic acid. The chloroform solution is dried and the solvent removed in vacuo yielding 14.5 g. of crude product. A solution of 11.5 g. of this solid in 1:1 chloroform-hexane is chromatographed on a 225 g. alumina (neutral, activity III) column. Elution with chloroform-hexane mixtures and then chloroform yields 4 g. of TLC pure material. Recrystallization from chloroform-hexane yields 2.4 g. of 1-(4,5-dihydro-2-thiazolyl)-5( or 6)-methyl-1H-benzimidazole-2-thiol; m.p. 197°–199°.

b. [1,1'-Biphenyl]-4-carbothioic acid, S-[1-(4,5-dihydro-2-thiazolyl)-5(or 6)-methyl-1H-benzimidazol-2-yl]ester Following the procedure of example 1(c) but substituting the 1-(4,5-dihydro-2-thiazolyl)-5-(or 6)-methyl-1H-benzimidazole-2-thiol for the 1-(4,5-dihydro-2-thiazolyl)-1H-benzimidazole-2-thiol, one obtains the titled product.

EXAMPLE 50

[1,1'-Biphenyl]-4-carbothioic acid, S-[5(or 6)-chloro-1-(4,5-dihydro-2-thiazolyl)-1H-benzimidazol-2-yl]ester a. 5(or 6)-Chloro-1-(4,5-dihydro-2-thiazolyl)-1H-benzimidazole-2-thiol A solution of 7.7 g. (0.041 mole) of 5-chloro-1H-benzimidazole-2-thiol in 270 ml. of dry glyme is stirred under nitrogen and 4.05 g. (0.0955 mole) of 57% sodium hydride dispersion in mineral oil is added. After stirring at room temperature for 1.5 hours, 12.5 g. (0.1035 mole) of 2-chloroethyl isothiocyanate is added and the reaction mixture is refluxed overnight. The solvent is removed in vacuo and the residue is triturated with methanol. After removal of the methanol in vacuo, hexane is added and removed by decantation. The gummy residue is partitioned between chloroform and water. The chloroform extract is dried with sodium sulfate and evaporated in vacuo yielding 3.7 g. of crude product. This solid material is dissolved in chloroform and chromatographed on an 80 g. alumina (neutral, activity II) column. Elution with chloroform yields 3.0 g. of TLC pure product. Crystallization from methanol yields 2.0 g. of 5(or 6)-chloro-1-(4,5-dihydro-2-thiazolyl)-1H-benzimidazole-2-thiol; m.p. 248°–250°.

b. [1,1'-Biphenyl]-4-carbothioic acid, S-[5(or 6)-chloro-1-(4,5-dihydro- 2-thiazolyl)-1H-benzimidazol-2-yl]ester Following the procedure of example 1(c) but substituting the 5(or 6)-chloro-1-(4,5-dihydro-2-thiazolyl)-1H-benzimidazole-2-thiol for the 1-(4,5-dihydro-2-thiazolyl)-1H-benzimidazole-2-thiol, one obtains the titled product.

EXAMPLE 51

[1,1'-Biphenyl]-4-carbothioic acid, S-[1-(4,5-dihydro-2-thiazolyl)-5(or 6) -nitro-1H-benzimidazol-2yl]ester a. 1-(4,5-Dihydro-2-thiazolyl)-5(or 6)-nitro-1H-benzimidazole-2-thiol 9.75 g. (0.05 mole) of 5-nitro-1H-benzimidazole-2-thiol is added, portionwise, at room temperature to a stirred slurry of 1.5 g. (0.06 mole) of sodium hydride in 400 ml. of dry glyme. After the evolution of hydrogen ceases, 7.25 g. (0.06 mole) of 2-chloroethyl isothiocyanate in 200 ml. of dry glyme is added. The resulting mixture is heated at reflux temperature for 3 hours. The mixture is cooled and the solvent is removed in vacuo. The residue is dissolved in CHCl$_3$ and washed with 10% HCl and twice with water. The organic fraction is dried (CaCl$_2$), treated with charcoal and concentrated in vacuo. The 1-(4,5-dihydro-2-thiazolyl)-5(or 6)-nitro-1H-benzimidazole-2-thiol is obtained by chromatography on alumina (neutral, activity I) and elution with cyclohexane-chloroform. The product is purified further by crystallization from ethanol.

b. [1,1'-Biphenyl]-4-carbothioic acid, S-[1-(4,5-dihydro-2-thiazolyl)-5(or 6)-nitro-1H-benzimidazol-2yl]ester Following the procedure of example 1(c) but substituting the 1-(4,5-dihydro-2-thiazolyl)-5(or 6)-nitro-1H-benzimidazole-2-thiol for the 1-(4,5-dihydro-2-thiazolyl)-1H-benzimidazole-2-thiol, one obtains the titled product.

EXAMPLES 52-70

Following the procedures of examples 49 to 51 but employing the substituted mercaptobenzimidazoles of formula IX shown in column A the product of formula I [R² is (p-phenyl)-benzoyl] shown in column B are obtained.

EXAMPLE 71

Butylcarbamothioic acid, S-[1-(4,5-dihydro-2-thiazolyl)-1H-benzimidazol-2-yl]ester To a slurry of 0.792 mg. (0.033 moles) of sodium hydride in 50 ml. of dry THF at room temperature

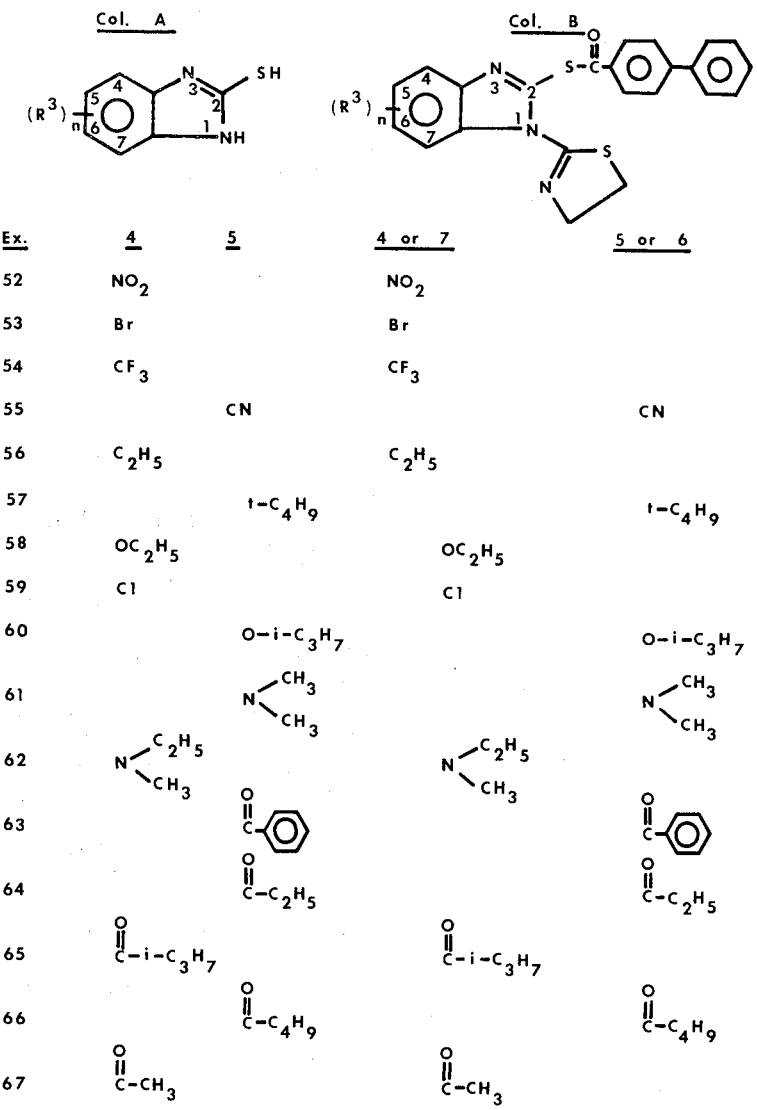

| Ex. | 4 | 5 | 4 or 7 | 5 or 6 |
|---|---|---|---|---|
| 52 | NO₂ | | NO₂ | |
| 53 | Br | | Br | |
| 54 | CF₃ | | CF₃ | |
| 55 | | CN | | CN |
| 56 | C₂H₅ | | C₂H₅ | |
| 57 | | t-C₄H₉ | | t-C₄H₉ |
| 58 | OC₂H₅ | | OC₂H₅ | |
| 59 | Cl | | Cl | |
| 60 | | O-i-C₃H₇ | | O-i-C₃H₇ |
| 61 | | N(CH₃)₂ | | N(CH₃)₂ |
| 62 | N(C₂H₅)(CH₃) | | N(C₂H₅)(CH₃) | |
| 63 | | C(O)-C₆H₅ | | C(O)-C₆H₅ |
| 64 | | C(O)-C₂H₅ | | C(O)-C₂H₅ |
| 65 | C(O)-i-C₃H₇ | | C(O)-i-C₃H₇ | |
| 66 | | C(O)-C₄H₉ | | C(O)-C₄H₉ |
| 67 | C(O)-CH₃ | | C(O)-CH₃ | |

Also, the following disubstituted compounds are obtained.

| | Col. A | | | | Col. B | | |
|---|---|---|---|---|---|---|---|
| Ex. | 4 | 5 | 6 | 7 | 4 | 5 | 6 | 7 |
| 68 | | Cl | Cl | | | Cl | Cl | |
| 69 | | OCH₃ | OCH₃ | | | OCH₃ | OCH₃ | |
| 70 | CH₃ | | | CH₃ | CH₃ | | | CH₃ |

Similarly, by following the procedures of Examples 49 to 51 but also substituting for the 2-chloroethylisothiocyanate the haloalkylisothiocyanates of examples 40 to 48, and substituting the R₂-halo of examples 2 to 39, other compounds of formula I within the scope of this invention are obtained.

there is added a solution of 7.05 g. (0.03 moles) of 1-(4,5-dihydro-2-thiazolyl)-1H-benzimidazole-2-thiol, from example 1b, in 100 ml. of THF. After stirring for 1 hour, a solution of 2.97 g. (0.03 moles) of butyl isocyanate in 50 ml. of THF is added. The resulting mixture is heated at reflux temperature for 4 hours. The THF is removed in vacuo and the residue is partitioned between CHCl₃ and water. The organic fraction is washed twice with water, dried over CaCl₂ and concentrated in vacuo. The purified butylcarbamothioic acid, S-[1-(4,5-dihydro-2-thiazolyl)-1H-benzimidazol-2-yl]ester is obtained by crystallization from acetone-hexane.

EXAMPLES 72-75

Following the procedure of example 71 but substituting for the butyl isocyanate the compounds listed below in column A, there is obtained respectively the compound of the following formula wherein $R^2$ is the radical listed in column B:

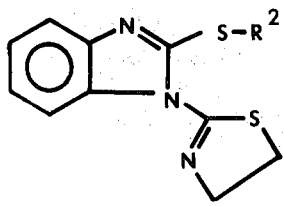

| Ex. | Col.A | Col.B |
|---|---|---|
| 72 | $CH_3-N=C=O$ | $-\underset{\underset{O}{\|}}{C}-\underset{\underset{H}{\|}}{N}-CH_3$ |
| 73 | $C_2H_5-N=C=S$ | $-\underset{\underset{S}{\|}}{C}-\underset{\underset{H}{\|}}{N}-C_2H_5$ |
| 74 | $C_3H_7-N=C=O$ | $-\underset{\underset{O}{\|}}{C}-\underset{\underset{H}{\|}}{N}-C_3H_7$ |
| 75 | $C_4H_9-N=C=S$ | $-\underset{\underset{S}{\|}}{C}-\underset{\underset{H}{\|}}{N}-C_4H_9$ |

Similarly, by following the procedure of example 71 but also substituting for the 1-(4,5-dihydro-2-thiazolyl)-1H-benzimidazole-2-thiol the intermediates of examples 40–70, other products with the scope of formula I are obtained.

EXAMPLE 76

[1,1'-Biphenyl]-4-carbothioic acid, S-[5(or 6)-amino-1-(4,5-dihydro-2-thiazolyl-1H-benzimidazol-2-yl]ester, hydrochloride

[1,1'-Biphenyl]-4-carbothioic acid, S-[1-(4,5-dihydro-2-thiazolyl)-5(or 6)-nitro-1H-benzimidaz ol-2-yl]ester from Example 51 in 200 ml. of ethanol is reduced with hydrogen over Raney Nickel catalyst at a pressure of 3 to 4 atmospheres. The catalyst is removed by filtration and the filtrate is reduced in vacuo to a volume of about 50 ml. and then saturated with dry HCl. Upon standing, the hydrochloride precipitates and is purified by crystallization from ethanol yielding the [1,1'-biphenyl]-4-carbothioic acid, S-[5(or 6)-amino-1-(4,5-dihydro-2-thiazolyl)-1H-benzimidazol-2-yl]ester, hydrochloride.

What is claimed is:

1. A compound of the formula:

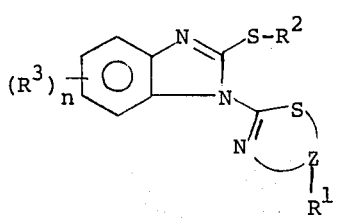

wherein Z is ethylene or propylene; $R^1$ is hydrogen, methyl, ethyl, phenyl, nitrophenyl, benzyl, phenethyl, tolyl, or xylyl; $R^2$ is alkyl of 1 to 5 carbons, benzyl, nitrobenzyl, phenethyl, nitrophenethyl, alkoxycarbonylalkylene wherein alkoxy is of 1 to 5 carbons and alkylene is of 1 to 3 carbons, dialkylaminoalkylene wherein each alkyl is of 1 to 3 carbons and alkylene is of 2 or 3 carbons, alkanoyl of from 2 to 18 carbons, benzoyl, substituted benzoyl wherein said substituent is halogen, alkyl of 1 to 3 carbons, or phenyl, phenylmethylcarbonyl, phenethylcarbonyl,

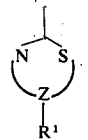

wherein $R^1$ and Z are as defined above,

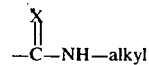

wherein alkyl is of 1 to 5 carbons, or

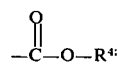

X is oxygen or sulfur; $R^4$ is alkyl of 1 to 3 carbons, phenyl, benzyl, or phenethyl; $R^3$ is hydrogen, halogen, nitro, amino, cyano, trifluoromethyl, alkyl of 1 to 3 carbons alkoxy of 1 to 3 carbons, dialkylamino wherein each alkyl is of 1 to 3 carbons, alkanoyl of 2 to 6 carbons, or benzoyl; and $n$ is 1 or 2; and when $R^2$ is dialkylaminoalkylene or $R^3$ is amino or dialkylamino the pharmaceutically acceptable acid-addition salts.

2. The compound of claim 1 wherein $R^1$ is hydrogen; $n$ is one; $R^2$ is benzoyl or substituted benzoyl wherein said substituent is halogen, alkyl of 1 to 3 carbons, or phenyl; and $R^3$ is hydrogen, halogen, nitro, or alkyl of 1 to 3 carbons.

3. The compound of claim 2 wherein Z is ethylene.

4. The compound of claim 3 wherein $R^3$ is hydrogen, methyl or Cl.

5. The compound of claim 4 wherein $R^3$ is hydrogen and $R^2$ is (p-phenyl)benzoyl.

6. The compound of claim 1 wherein Z is ethylene; $R^1$ and $R^3$ are hydrogen; and $R^2$ is

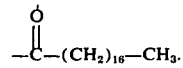

7. The compound of claim 1 wherein Z is ethylene; $R^1$ and $R^3$ are hydrogen; and $R^2$ is

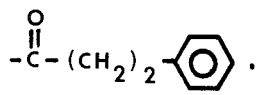

8. The compound of claim 1 wherein Z is ethylene; $R^1$ and $R^3$ are hydrogen; and $R^2$ is

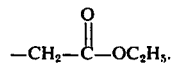

* * * * *

UNITED STATES PATENT AND TRADEMARK OFFICE
CERTIFICATE OF CORRECTION

PATENT NO. : 3,927,014
DATED : December 16, 1975
INVENTOR(S) : G. Rovnyak et al.

It is certified that error appears in the above-identified patent and that said Letters Patent are hereby corrected as shown below:

Col. 4, line 22, "Similarly, compounds" should start a new paragraph.

Col. 4, line 42, "2-pheny" should read --2-phenyl--.

Col. 5, line 62, "thiazoline," should read --thiazoline.--.

Col. 6, line 9, "o.31 g." should read -0.31 g.--.

Col. 9, line 60, "a. (Benzimidazol-2-yl)" should start a new paragraph.

Col. 11, line 43, "temperaure" should read --temperature--.

Col. 12, line 42, "2yl" should read --2-yl--.

Col. 12, line 63, "2yl" should read --2-yl--.

Signed and Sealed this fourth Day of May 1976

[SEAL]

Attest:

RUTH C. MASON
Attesting Officer

C. MARSHALL DANN
Commissioner of Patents and Trademarks